United States Patent [19]
Yamamoto et al.

[11] Patent Number: 5,635,082
[45] Date of Patent: Jun. 3, 1997

[54] PROCESS FOR PRODUCING A THIN FILM HEAD OF THE FLOATING TYPE

[75] Inventors: Tomomi Yamamoto, Hirakata; Naoto Matono, Kadoma; Hitoshi Noguchi, Higashiosaka, all of Japan

[73] Assignee: Sanyo Electric Co., Ltd., Osaka, Japan

[21] Appl. No.: 537,439

[22] Filed: Oct. 2, 1995

Related U.S. Application Data

[62] Division of Ser. No. 293,216, Aug. 19, 1994, abandoned.

[30] Foreign Application Priority Data

Aug. 27, 1993 [JP] Japan ..................... 5-212488

[51] Int. Cl.$^6$ .................................................. G11B 5/127
[52] U.S. Cl. ................ 216/22; 204/192.2; 204/192.22; 204/192.23; 216/51; 216/52; 360/103
[58] Field of Search .................. 216/22, 40, 47, 216/49, 51, 52; 205/122; 204/192.15, 192.2, 192.22, 192.33; 29/603.07; 360/103

[56] References Cited

U.S. PATENT DOCUMENTS

| | | |
|---|---|---|
| 3,610,837 | 10/1971 | Brede et al. .......................... 179/103 |
| 4,130,847 | 12/1978 | Head et al. ........................... 360/122 |
| 4,219,853 | 8/1980 | Albert et al. .......................... 360/103 |
| 4,673,996 | 6/1987 | White .................................... 360/103 |
| 4,749,439 | 6/1988 | Kobayashi et al. .................. 156/645 |
| 4,791,719 | 12/1988 | Kobayashi et al. ............... 29/603.14 |
| 5,079,035 | 1/1992 | Krounbi et al. ...................... 427/130 |
| 5,237,476 | 8/1993 | Bischoff et al. ...................... 360/126 |
| 5,475,550 | 12/1995 | George ................................. 360/113 |

Primary Examiner—Kathryn L. Gorgos
Assistant Examiner—William T. Leader
Attorney, Agent, or Firm—Nikaido Marmelstein Murray & Oram LLP

[57] ABSTRACT

A thin film head of the floating type includes a head slider 1 having a surface to be opposed to the signal face of a recording medium with a small space formed therebetween. At least one head element 2 is formed by thin film forming techniques on a face of the head slider 1 orthogonal to the slider surface. A protective layer 3 is formed over the head slider face and covers the head element 2. The head slider 1 has a pair of side faces orthogonal to the slider surface to be opposed to the medium and extending in parallel to each other respectively at opposite sides of the head element 2. The protective layer 3 is formed at each of its opposite side portions with a bulging-out curved face R smoothly extending from the surface of the protective layer 3 to the side face of the head slider 1.

3 Claims, 4 Drawing Sheets

PROCESS FOR PRODUCING A THIN FILM HEAD OF THE FLOATING TYPE

This is a divisional, of application Ser. No. 08/293,216 filed Aug. 19, 1994, now abandoned.

FIELD OF THE INVENTION

The present invention relates to inductive thin film heads, magnetoresistive thin film heads or composite thin film heads comprising these two types in combination for use in magnetic disc devices, etc., and more particularly to the structure of a thin film head of the floating type which has a head slider to be opposed to the signal face of a recording medium with a small space formed therebetween, and a process for producing the same.

BACKGROUND OF THE INVENTION

FIG. 5(e) shows a thin film head of the floating type, which comprises a head slider 10 formed with chamfers 12, ABS (air bearing surface) faces 13, etc. on the surface thereof to be opposed to the signal face of recording media. The head slider 10 has a pair of head elements 20, 20 formed by the thin film deposition process and photolithographic techniques on a face thereof orthogonal to the above-mentioned surface.

The illustrated floating-type thin film head is an inductive thin film head wherein the head element 20 comprises a pair of magnetic films arranged with a gap portion formed therebetween. Magnetoresistive thin film heads comprising a magnetoresistive element also include floating-type thin film heads which comprise a similar head slider and which are fabricated by the thin film deposition process and photolithographic techniques.

FIG. 5(a) to FIG. 5(e) show a process for producing floating-type thin film heads.

With reference to FIG. 5(a), a multiplicity of head elements 20 are formed by the thin film deposition process and photolithographic techniques on a substrate of $Al_2O_3$-TiC or like ceramic, and a protective layer (not shown) of $SiO_2$, $Al_2O_3$ or the like is formed to a thickness of about 50 μm over the substrate to cover the head elements 20. The ceramic substrate 11 is then divided by array separating grooves 14 into arrays each having a plurality of head elements 20 as seen in FIG. 5(b). These arrays are to be divided into head chips each having one pair of head elements 20, 20 by chip separating grooves 15 which will be formed in a later step as indicated in the broken lines.

Next as shown in FIGS. 5(c) and (d), grooves 16 are formed in the surface of the ceramic substrate 11 of each array which surface is to be opposed to recording media, followed by formation of a chamfer 12 and ABS faces. The substrate is thereafter eventually divided by the above-mentioned chip separating grooves into head chips of specified shape as shown in FIG. 5(e).

With an increase in the recording density in recent years, the track width has become greatly diminished, giving rise to a need to give the head element a depth with the highest possible accuracy, so that the medium-opposed surface is finished with high precision in depth defining working.

The process for producing conventional thin film heads of the floating type is such that as shown in FIG. 5(a) to FIG. 5(e), a protective layer covering many head elements 20 is formed over the substrate 11, which is thereafter divided into chips by machining. The machining work therefore produces a sharp edge E of 90 deg at each of opposite sides of the protective layer 30 of the resulting head chip as shown in FIG. 2.

When the floating-type thin film head is mounted in a magnetic disc device and used for recording or reproducing signals, a lateral air current due to the rotation of the disc will act on the side face of the head slider 10 as indicated by arrows in FIG. 2 especially in the case where the thin film head is positioned at an increased skew angle due to a reduction in the size of the head. This entails the problem that the thin film head, which is subjected to the force of the lateral air current, is unable to retain its position with stability.

Further with the process for producing conventional floating-type thin film heads, the step of forming the protective layer of $SiO_2$, $Al_2O_3$ or the like on the surface of the substrate 11 by sputtering involves the problem that internal stress warps the substrate 11. If the warped substrate 11 is divided into head chips, the chips vary in the precision of the depth defining work, failing to afford heads which exhibit the desired performance.

SUMMARY OF THE INVENTION

An object of the present invention is to provide a thin film head of the floating type which is so constructed that when mounted in a magnetic disc device or the like for use in recording or reproducing signals, the head is less susceptible to the influence of lateral air currents.

Another object of the present invention is to provide a process for producing thin film heads of the floating type wherein the substrate to be made into head sliders is inhibited from warping to realize high working precision.

The present invention provides a thin film head of the floating type which comprises a head slider having a surface to be opposed to the signal face of a recording medium with a small space formed therebetween, a main portion including one or a plurality of head elements formed by thin film forming techniques on a face of the head slider orthogonal to the slider surface, and a protective layer formed over the above-mentioned face of the head slider and covering the main portion.

The head slider has a pair of side faces orthogonal to the slider surface and extending in parallel to each other respectively at opposite sides of the main portion. The protective layer is formed at each of opposite side portions thereof with a bulging-out curved face smoothly extending from the surface of the protective layer to the side face of the head slider.

Even if the side face of the head slider is acted on by a lateral air current due to the rotation of the disc when the floating-type thin film head is used for recording or reproducing signals as mounted on a magnetic disc device, the air current smoothly escapes toward the slider face formed with the head element or elements by being guided by the bulging-out curved face formed at the side portion of the protective layer, so that the slider side face is not subjected to a great air pressure.

The present invention provides a process for producing thin film heads of the floating type described wherein in a head forming step, a multiplicity of head elements are formed by thin film forming. techniques on a substrate to be made into head sliders; and in a protective layer forming step, a mask having an opening for each main portion for constituting one thin film head is positioned above the substrate surface formed with the head elements, and an insulating material for making a protective layer is formed into a film on the substrate with the mask provided thereover. Further in a chip forming step, the mask is removed, and the substrate is divided into a plurality of head chips each having the main portion.

In the protective layer forming step of the process described above, the protective layer is formed in a divided form in conformity with the shape of the openings in the mask, so that the resulting internal stress is smaller than in the conventional case wherein the protective layer is formed over the entire surface of the substrate.

Further when the protective layer is formed with the mask provided over the substrate surface the material to be made into the protective layer ingresses through the opening of the mask and is deposited as positioned inwardly of the mask, i.e., under the mask edge portion defining the opening, owing to anisotropy involved in film formation, with the result that the peripheral wall formed is not perpendicular to the substrate surface but has bulging-out curved faces. When the substrate is subsequently processed by the chip forming step, the portion of the peripheral wall having the curved face provides each of opposite side portions of the protective layer. The surface of the protective layer and each of opposite side faces of the head slider are therefore smoothly interconnected by the bulging-out curved face.

Consequently, thin film heads of the floating type are obtained which have the structure of the invention described.

Even if the floating-type thin film head embodying the invention is exposed to a lateral air current when it is mounted, for example, in a magnetic disc device and used for recording or reproducing signals, the pressure of the air current acting on the head is small as previously stated and is unlikely to render the head unstable in position.

With the process of the present invention for producing floating-type thin film heads, the internal stress occurring in the substrate to be made into head sliders is slight and unlikely to warp the substrate, which can therefore be subsequently worked with high precision in the chip forming step.

DETAILED DESCRIPTION OF EMBODIMENTS

An embodiment of the present invention will be described below in detail with reference to the drawings concerned.

Figure 1:
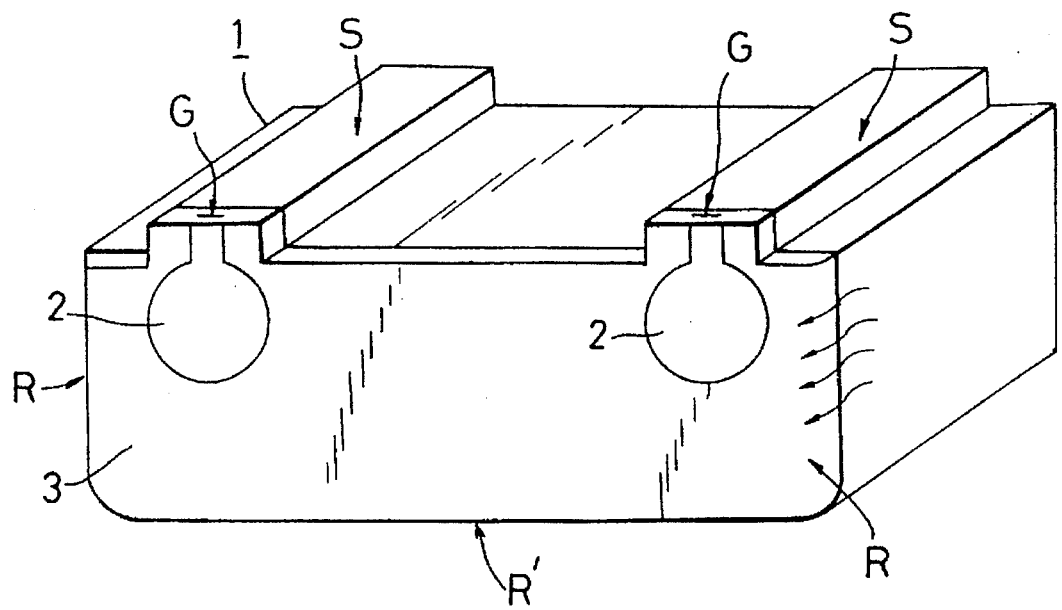
FIG. 1 is a perspective view showing the appearance of a floating-type thin film head embodying the invention.
Figure 2:
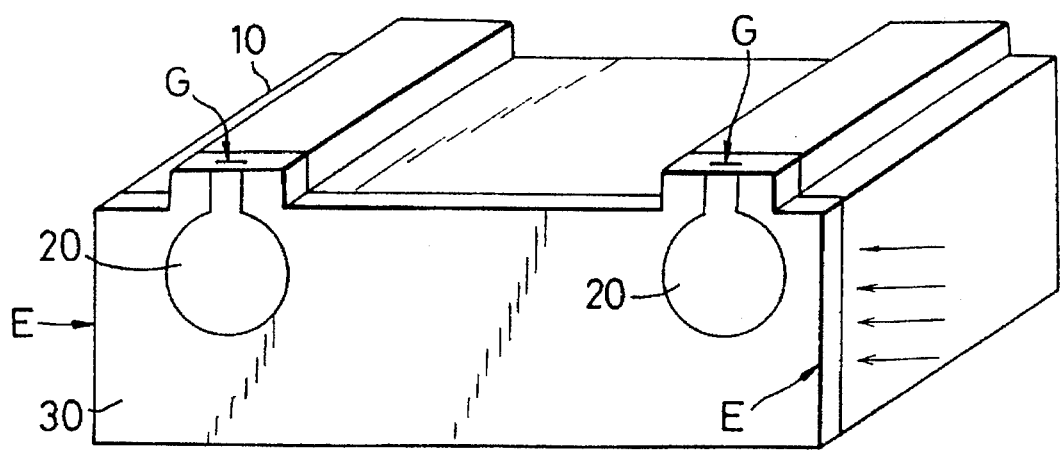
FIG. 2 is a perspective view showing the appearance of a conventional floating-type thin film head.

Referring to FIG. 1 showing a thin film head of the floating type embodying the invention, a head slider 1 has a surface S which is to be opposed to the signal face of a recording medium with a small space formed therebetween, and a pair of head elements 2, 2 formed by thin film forming techniques on a face of the head slider 1 orthogonal to the slide surface S. These head elements 2 are covered with a protective layer 3 made of $SiO_2$, $Al_2O_3$ or the like and having a thickness of about 50 μm, The head slider 1 has a pair of slide faces orthogonal to the surface S to be opposed to the medium. The protective layer 3 is formed at each of opposite side portions thereof with a bulging-out curved face R smoothly extending from the surface of the protective layer 3 to the side face of the head slider 1. A similar bulging-out face R' is formed also at the lower end of the protective layer 3. These curved faces have a radius of the order of at least tens of micrometers. The radius can be further increased by selectively varying the etching condition to be described later.

Accordingly, even if a lateral air current strikes on the side face of the head slider 1 as indicated by arrows in FIG. 1, the air current smoothly flows toward the surface of the protective layer 3 without disturbance by being guided by the bulging-out curved face of the protective layer side portion. Consequently, the head is held in a stabilized position.

FIG. 3(a) to FIG. 3(d) and FIG. 4(a) to FIG. 4(c) show a process, including a series of steps, for producing thin film heads of the floating type described.

Figure 3A:
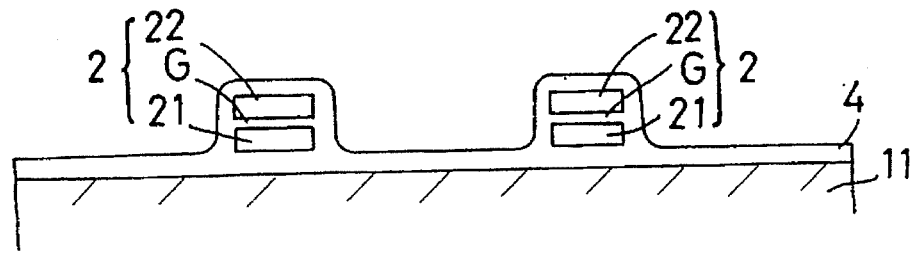
FIG. 3(a) to FIG. 3(d) are a series of process diagrams showing the first half of a process of the invention for producing floating-type thin film heads.

FIG. 3(a) shows a wafer as completely prepared. A ceramic substrate 11 of $Al_2O_3$ -TiC is formed with an insulating layer 4 and a multiplicity of head elements 2 each comprising a lower magnetic film 21 and an upper magnetic film 22 with a gap portion G provided therebetween.

Figure 3B:
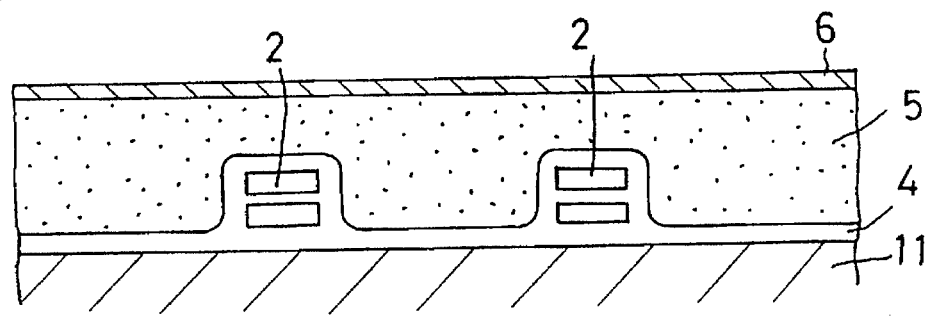
Figure 3C:
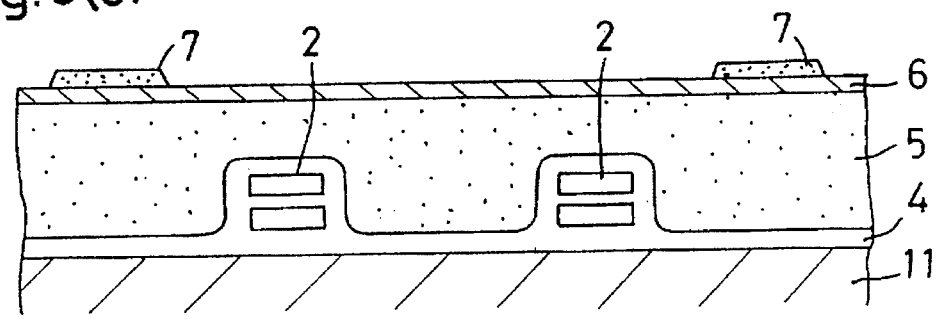

With reference to FIG. 3(b), a resist is applied to the substrate 11 to form a resist layer 5 having a thickness of tens of micrometers and covering the multiplicity of head elements 2. The resist layer 5 is covered with a lift-off layer 6 made of Ti, Cu or like metal film or SOG (spin-on glass) and formed by a method such as coating, sputtering or vacuum evaporation, As shown in FIG. 3(c), a resist 7 is then applied to the surface of the lift-off layer 6 in a predetermined pattern. The resist 7 is patterned in the form of a lattice so as to divide the multiplicity of head elements 2 into pairs of head elements 2, 2.

Figure 3D:
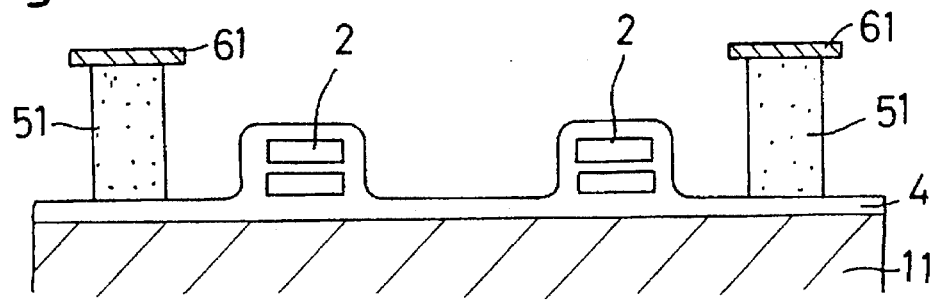

With the resist 7 serving as a mask, the lift-off layer 6 is etched by RIE (reaction ion etching) or IBE (ion beam etching) to shape a mask 61 of latticelike pattern as seen in FIG. 3(d). Through the mask 61, the resist layer 5 shown in FIG. 3(c) is etched, for example, by RIE or ashing. In this step, the etching condition is so adjusted as to form undercut resist portions 51 as seen in FIG. 3(d).

Figure 4A:
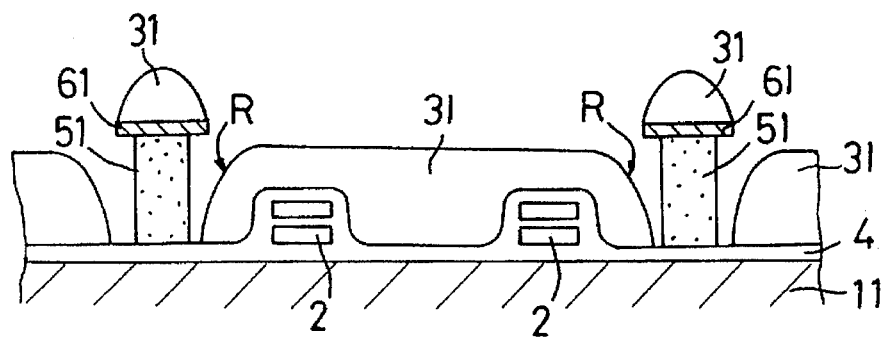
FIG. 4(a) to FIG. 4(c) are a series of process diagrams showing the second half of the process.

Next as shown in FIG. 4(a), an insulating material, such as $SiO_2$ or $Al_2O_3$, is deposited on the substrate through the mask 61 of latticelike pattern to form an insulating film 31 having a thickness of tens of micrometers. Since the resist portions 51 are undercut as illustrated, the insulating material ingresses to the underside of the mask 61 inwardly thereof and is deposited. As a result, the outer peripheral wall of the insulating film 31 formed has smooth bulging-out curved faces R as illustrated.

Figure 4B:
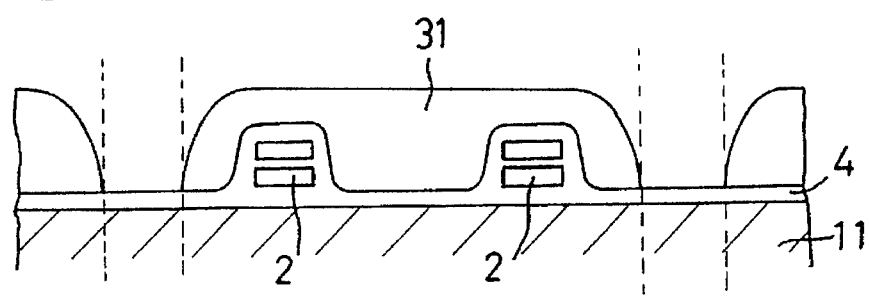
Figure 4C:
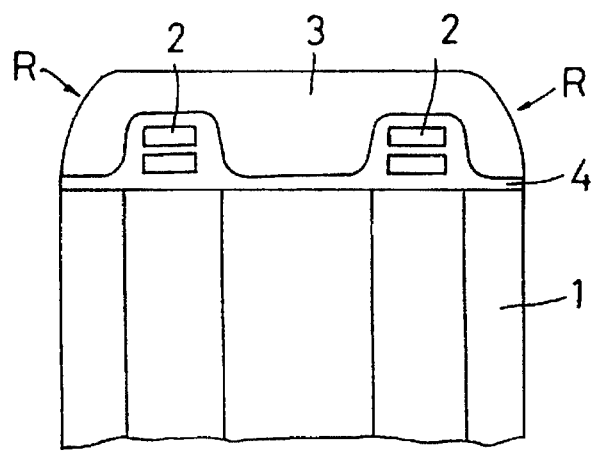
Figure 5A:
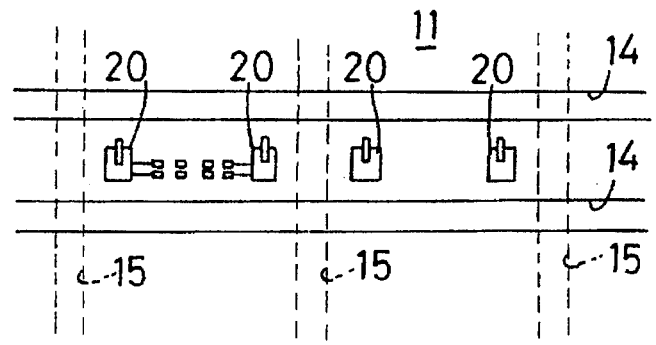
FIG. 5(a) to FIG. 5(e) are a series of process diagrams showing a process for producing conventional floating-type thin film heads.
Figure 5B:
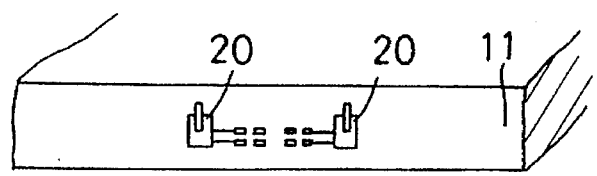
Figure 5C:
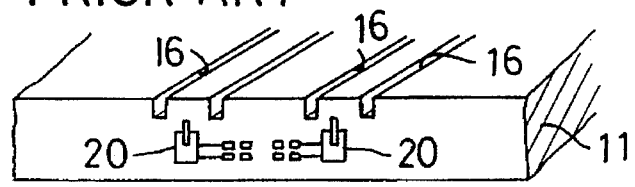
Figure 5D:
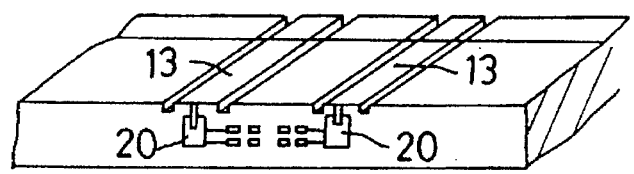
Figure 5E:
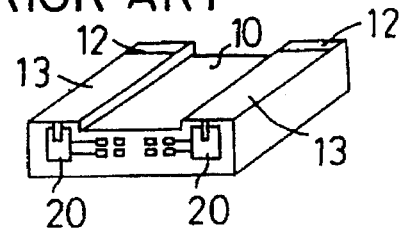

The resist portions 51 are thereafter removed as by ashing or wet etching, and at the same time, the mask 61 on the resist portions 51 and the insulating film 31 on the mask 61 are also removed, Finally, the substrate 11 is chamfered and given ABS faces as previously mentioned and then divided along the broken lines shown in FIG. 4(b) into head chips each having a pair of head elements 2, 2 as seen in FIG. 4(c).

With the head chip obtained, the portions of peripheral wall of the insulating film 31 having the respective curved faces provide opposite side portions of the protective layer 3, and the surface of the protective layer 3 and the pair of opposite side faces of the head slider 1 are smoothly interconnected by the bulging-out curved faces, The production process described forms the insulating film 31 as divided into the protective layers of individual head chips as shown in FIG. 4(a). This obviates the likelihood that internal stress will deform the ceramic substrate 11, assuring the subsequent depth defining work of high precision to achieve a high yield.

The embodiments described above are intended to illustrate the present invention and should not be construed as limiting the invention defined in the appended claims or reducing the scope thereof. The head and process of the invention are not limited to the foregoing embodiments but can of course be modified variously without departing from the spirit of the invention as set forth in the claims.

For example, the mask 61 for use in forming the material for the protective layer into a film is not limited to one formed by etching the lift-off layer but can be, for example, a stainless steel mask prepared specifically for this purpose.

What is claimed is:

1. A process for producing floating thin film heads each comprising a) a head slider having a slider surface to be opposed to the signal face of a recording medium with a small space formed therebetween, b) one or a plurality of head elements formed by thin film forming techniques on a face of the head slider orthogonal to said slider surface, and c) a protective layer formed over said face of the head slider and covering the head element or elements, the process comprising the step of:

a head forming step comprising forming a multiplicity of thin film head elements on a substrate to be made into head sliders;

a protective layer forming step comprising a step of providing a mask at a position above the substrate surface on which the multiplicity of thin film head elements are formed, the mask having an opening for each of the thin film heads to be fabricated said opening to expose one or a plurality of head elements for each thin film head, and a step of forming an insulating material for forming a protective layer as a film on the substrate surface by sputter deposition through the mask provided thereover, wherein the mask providing step comprises a first step of forming a resist layer over the multiplicity of head elements, a second step of forming a lift-off layer over the resist layer, and a third step of etching the lift-off layer to shape the lift-off layer into the mask and undercutting the resist remaining beneath the mask; and a chip forming step comprising removing the mask along with the resist and dividing the substrate into a plurality of thin film heads each having said one or plurality of head elements.

2. A processing for producing floating thin film heads as defined in claim 1, wherein the protective layer is formed at each of opposite side portions of the protective layer with a curved face when the protective layer is formed with the mask, by allowing the insulating material to ingress through the opening in the mask to the underside of the mask and to be deposited.

3. A process for producing floating thin film heads as defined in claim 1, wherein the protective layer is formed at each of opposite side portions of the protective layer with a curved face when the protective layer is formed with the mask, and the substrate is divided into a plurality of thin film heads each having said one or plurality of head elements and said curved faces at opposite sides portions of the protective layer.

* * * * *